(12) United States Patent
Itkin

(10) Patent No.: US 10,331,598 B2
(45) Date of Patent: Jun. 25, 2019

(54) ADDING A NETWORK PORT TO A NETWORK INTERFACE CARD

(71) Applicant: MELLANOX TECHNOLOGIES, LTD., Yokneam (IL)

(72) Inventor: Yuval Itkin, Zoran (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 0 days.

(21) Appl. No.: 15/896,092

(22) Filed: Feb. 14, 2018

(65) Prior Publication Data
US 2018/0239730 A1 Aug. 23, 2018

Related U.S. Application Data

(60) Provisional application No. 62/461,854, filed on Feb. 22, 2017.

(51) Int. Cl.
G06F 13/14 (2006.01)
H04J 1/10 (2006.01)
G06F 13/38 (2006.01)
G06F 13/42 (2006.01)
H04L 29/08 (2006.01)

(52) U.S. Cl.
CPC ........ *G06F 13/385* (2013.01); *G06F 13/4221* (2013.01); *G06F 2213/3808* (2013.01); *H04L 67/125* (2013.01)

(58) Field of Classification Search
None
See application file for complete search history.

(56) References Cited

U.S. PATENT DOCUMENTS

| 6,367,035 | B1 | 4/2002 | White |
| 6,839,789 | B2* | 1/2005 | Kramer ............... H04L 5/1461 370/492 |
| 8,542,689 | B2 | 9/2013 | Davis |
| 8,705,545 | B2 | 4/2014 | Reed et al. |
| 9,872,205 | B2 | 1/2018 | Shah et al. |
| 2002/0162026 | A1 | 10/2002 | Neuman et al. |
| 2003/0026260 | A1 | 2/2003 | Ogasawara et al. |
| 2003/0145045 | A1 | 7/2003 | Pellegrino et al. |
| 2007/0115981 | A1* | 5/2007 | Jreij .................... H04L 61/2015 370/392 |
| 2008/0005222 | A1 | 1/2008 | Lambert et al. |
| 2008/0043769 | A1* | 2/2008 | Hirai .................... H04L 41/042 370/420 |

(Continued)

FOREIGN PATENT DOCUMENTS

CN 106227636 A 12/2016

OTHER PUBLICATIONS

U.S. Appl. No. 15/051,750 office action dated Jun. 6, 2018.
(Continued)

*Primary Examiner* — Hyun Nam
(74) *Attorney, Agent, or Firm* — Kligler & Associates

(57) ABSTRACT

A host computer connects to a data network via a host interface to a network interface controller A sideband interface connects the network interface controller to a baseboard management controller having a management network port for connection to a management network. A path is established in the network interface controller between the host interface the basement management controller via the sideband interface of the network interface controller to conduct data selectively between the management network and either the host central processing unit and the or internally in the network interface controller.

14 Claims, 6 Drawing Sheets

(56) References Cited

U.S. PATENT DOCUMENTS

| | | |
|---|---|---|
| 2011/0040917 A1 | 2/2011 | Lambert et al. |
| 2014/0258738 A1 | 9/2014 | Greenwalt et al. |
| 2015/0172112 A1 | 6/2015 | Itkin et al. |
| 2015/0215343 A1 | 7/2015 | Itkin et al. |
| 2016/0248619 A1 | 8/2016 | Itkin |
| 2016/0248620 A1 | 8/2016 | Itkin |
| 2016/0283513 A1* | 9/2016 | Antony ................. G06F 16/188 |
| 2017/0104770 A1* | 4/2017 | Jreij ........................ H04L 63/20 |
| 2017/0242819 A1 | 9/2017 | Itkin et al. |
| 2019/0012288 A1* | 1/2019 | Zhao ................... G06F 13/4081 |

OTHER PUBLICATIONS

European Application # 17209619 search report dated Feb. 8, 2018.
Intel., "PRO/1000 PT Dual Port Server Adapter", 4 pages, Jan. 1, 2006.
Anonymous., "NIC with embedded firewall", Geek.com, 9 pages, Apr. 29, 2002.
Anonymous., "Intelligent Platform Management Interface", Wikipedia, 8 pages, Dec. 10, 2016.
U.S. Appl. No. 15/051,750 office action dated Feb. 27, 2018.
InfiniBand TM Architecture Specification, vol. 1, Release 1.2.1, 1727 pages, Nov. 2007 Copyright.
PCI Express® Base Specification, Revision 3.1 , 1073 pages, Mar. 2014.
Itkin et al., U.S. Appl. No. 15/391,894 filed Dec. 28, 2016.
DMTF DSP0222, "Network Controller Sideband Interface (NC-SI) Specification", version 1.1.0, 138 pages, Sep. 23, 2015.
Intel, "NC-SI Overview and Performance", Revision 1.1, 27 pages, Mar. 2013.

* cited by examiner

ADDING A NETWORK PORT TO A NETWORK INTERFACE CARD

CROSS-REFERENCE TO RELATED APPLICATIONS

This Application claims the benefit of U.S. Provisional Application No. 62/461,854, filed 22 Feb. 2017, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to network arrangements and protocols for real-time communications. More particularly, this invention relates to aspects of the management of network interface devices.

2. Description of the Related Art

The meanings of certain acronyms and abbreviations used herein are given in Table 1.

TABLE 1

| Acronyms and Abbreviations | |
|---|---|
| BMC | Baseboard Management Controller |
| CPU | Central Processing Unit |
| IPMI | Intelligent Platform Management Interface |
| NC-SI | Network Controller Sideband Interface |
| NIC | Network Interface Card |
| PCI | Peripheral Component Interconnect |
| PCIe | PCI Express |
| QP | Queue Pair |
| RBT | RMII Based Transport |
| RMII | Reduced Media Independent Interface |
| RTM | Remote Transactional Memory |
| SMBus | System Management Bus |

Various techniques for remote management of a host computer are known in the art. For example, U.S. Pat. No. 6,367,035 describes methods and apparatus for diagnosing and correcting faults in a host computer having a central processing unit (CPU) and ancillary units. The apparatus is in two parts: a first part in the form of a service card to be coupled to the host computer and operable to disable the CPU and operate and/or interrogate the ancillary units, and a second part in the form of a remote support station to be coupled to the first part and operable to diagnose faults in the computer through the first part and to effect at least some corrective measures through the first part. The first and second parts are located remote from each other and connected by a telecommunication link such as through modems.

The sorts of capabilities that were envisioned in the above patent have been standardized in the Intelligent Platform Management Interface (IPMI) specifications, which provide management and monitoring capabilities independently of the host CPU, firmware, and operating system.

IPMI defines a set of interfaces used by system administrators for out-of-band management of computer systems and monitoring of their operation. IPMI enables the administrator to manage a computer, even when it is powered off or otherwise unresponsive, by using a network connection to a baseboard management controller (BMC) in the computer, rather than to the operating system or login shell. The baseboard management controller, which is typically implemented as a specialized microcontroller embedded on the motherboard of the computer, manages the interface between system management software and platform hardware.

In modern computing systems, a data center may comprise a cluster of servers, which are locally or remotely managed by a baseboard management controller. Typically, server parameters such as operating system settings, boot parameters and bus configuration, e.g., PCIe configuration, may be controlled by the baseboard management controller.

For example, commonly assigned U.S. Patent Application Publication No. 2015/0215343 by Itkin et al., which is herein incorporated by reference, describes an arrangement in which host management is mediated by a network adaptor whose ports are configured to connect to a switch in a communication network. The circuitry is coupled to a network node that includes multiple hosts, and is configured to exchange management packets between a control server and multiple baseboard management controller units associated respectively with the multiple hosts, and to exchange data packets between the hosts and one or more remote nodes.

Sideband interfaces are typically used in network interface cards (NICs) to allow a base board management controller to connect to the network through the main port(s) of the card.

SUMMARY OF THE INVENTION

In many cases the management network is a separate network, which is not shared with the regular data traffic network. The typical use of a sideband interface is limited to enable the BMC to use the network interface ports of the network interface card for connecting to the management network. Provisions for the host CPU to connect to the management network conventionally require an additional management network port on the network interface card. Alternatively, an additional network interface card can be dedicated to connecting the host CPU to the management network.

Embodiments of the invention enable the host CPU to connect to the management network by using the sideband interface to access the management network through the BMC, thus saving the need for an additional port on the NIC. This functionality does not prevent the BMC from managing the NIC over the same sideband interface.

There is provided according to embodiments of the invention an apparatus for communication, including a host computer with a host central processing unit, a network interface controller having a plurality of network ports connectable to a data network, a host interface in the network interface controller linked to the host central processing unit, a sideband interface in the network interface controller and a baseboard management controller linked to the network interface controller via the sideband interface. The baseboard management controller has a management network port and is connectable to a management network via the management network port. A link in the network interface controller between the host interface and the sideband interface of the network interface controller conducts data between the host central processing unit and the baseboard management controller.

One aspect of the apparatus includes interface logic circuitry in the network interface controller, adapted to select from a management data path to conduct management traffic between the host interface and the sideband interface and a network data path to conduct network traffic between the host interface and the network ports.

According to a further aspect of the apparatus, the interface logic circuitry also includes network interface logic in the network data path for selecting the network ports for transmission of the network traffic therethrough.

Yet another aspect of the apparatus includes switch logic circuitry in the baseboard management controller configured to selectively route traffic arriving from the management network to a destination in the network interface controller or the host central processing unit through the link in the network interface controller.

Still another aspect of the apparatus includes interface logic circuitry in the network interface controller that is linked to the host interface, the network ports and the sideband interface, wherein the interface logic circuitry is configured to select a management data path to conduct management traffic between the baseboard management controller and the host central processing unit or a network data path to conduct network traffic between the host central processing unit and the network ports.

An additional aspect of the apparatus includes a Peripheral Component Interconnect Express (PCIe) switch linked to the host interface and the host central processing unit.

Communication between the network interface controller and the data network is carried out using a first communications protocol and communication between the baseboard management controller and the management network is carried out using a second communications protocol.

There is further provided according to embodiments of the invention method of communication, which is carried out in a system including a host computer with a host central processing unit, a network interface controller having a plurality of network ports, a host interface in the network interface controller linked to the host central processing unit, and a sideband interface in the network interface controller. The method is carried out by linking a baseboard management controller to the network interface controller via the sideband interface, connecting the baseboard management controller to a management network via a management network port in the baseboard management controller, connecting the network interface controller to a data network through the network ports, establishing a management networking data path in the network interface controller between the host interface and the sideband interface of the network interface controller, and exchanging the management networking data between the host central processing unit and the management network via the baseboard management controller to the management network.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

The terms "link", "links", "couple" and "couples" are intended to mean either an indirect or direct connection. Thus, if a first device couples to a second device, that connection may be through a direct connection, or through an indirect connection via other devices and connections.

Overview.

Figure 1:
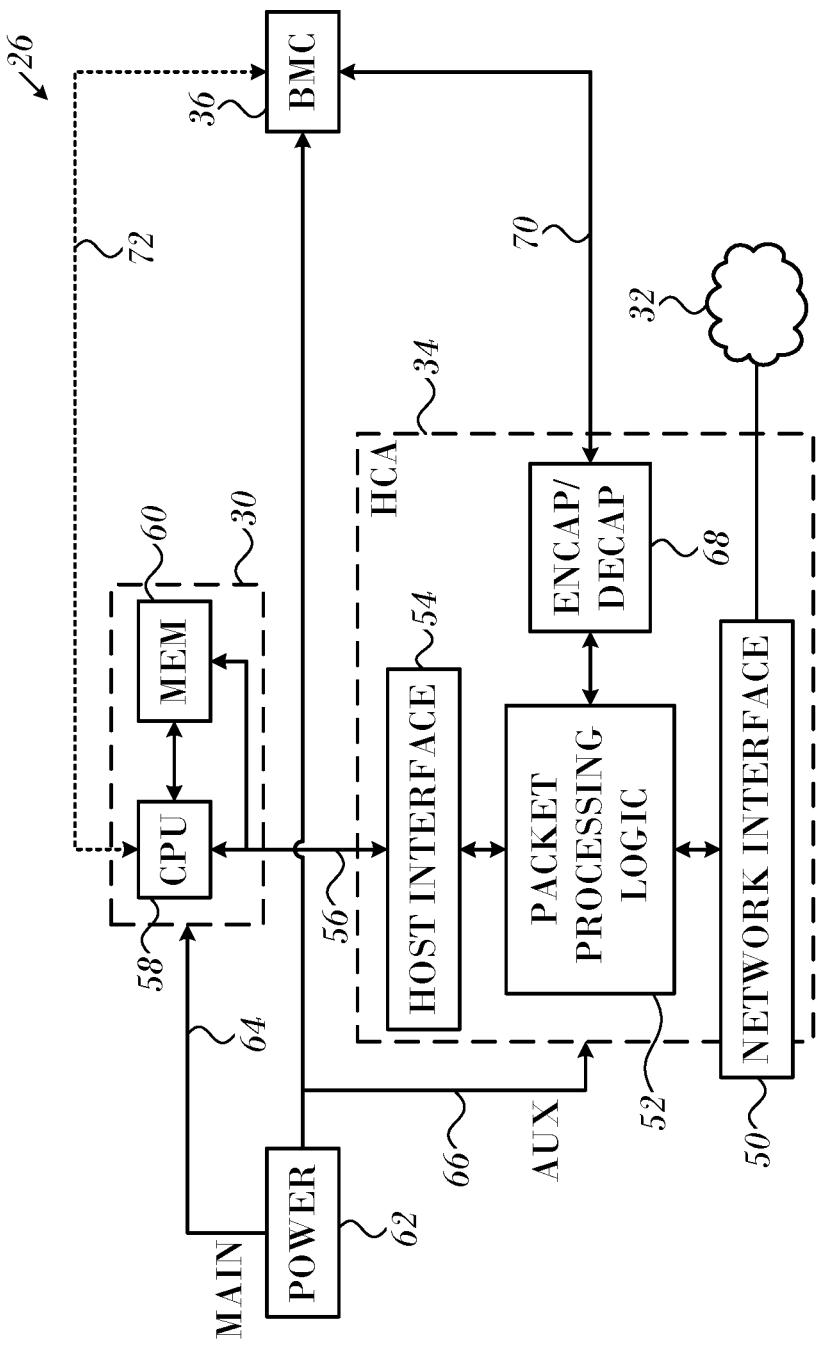
FIG. 1 is a block diagram that schematically shows elements of a host computer, in accordance with an embodiment of the invention.

FIG. 1 is a block diagram that schematically shows details of a server 26, in accordance with an embodiment of the invention. A network element such as a network interface controller or a host channel adapter 34 comprises a network interface 50, which connects to InfiniBand network 32, and a host interface 54, connecting via a peripheral component bus 56, such as a PCI Express Remote Transactional Memory. (PCIe®) bus, to host complex 30. The host complex comprises a central processing unit (CPU) 58 and system memory 60, as well as other components that are known in the art. Packet processing logic 52 in host channel adapter 34 normally receives and processes incoming packets on multiple queue pairs from other servers on network 32, and passes the packet payloads to memory 60 for processing by processes running on CPU 58, and similarly generates and transmits packets to the other servers on network 32. The specifics of these packet processing and communication functions are known in the art and are beyond the scope of the present disclosure.

In addition, as explained above, packet processing logic 52 sets up at least one queue pair (QP) that is designated for transmitting and receiving encapsulated management packets. Packet processing logic 52 recognizes data packets received from network 32 on this designated queue pair as packets that encapsulate management packets, and passes these packets to encapsulation/decapsulation logic 68. The decapsulation logic decapsulates and passes the management packets via a sideband connection 70 to BMC 36. Logic 68 similarly receives, via sideband connection 70, management response packets from BMC 36, and encapsulates the management response packets in InfiniBand data packets. Packet processing logic 52 transmits these packets over the appropriate management queue pair, via network interface 50 and network 32 for decapsulation. Encapsulation/decapsulation logic 68 typically comprises dedicated or programmable logic circuits for purposes of basic packet handling, and may in addition comprise an embedded processor, which is programmed in software or firmware to perform other management functions.

Server 26 also comprises a power supply 62, which feeds a main power rail 64 to supply operating power to host complex 30 (including CPU 58 and system memory 60), and an auxiliary power rail 66, which supplies auxiliary power to other elements of server 26 even when the host complex is powered down. Auxiliary power rail 66 supplies power, inter alia, to BMC 36 and host channel adapter 34. As a result, even when CPU 58 is powered down, in a sleep state for example, host channel adapter 34 is able to receive, decapsulate, and pass management packets via sideband connection 70 to BMC 36. BMC 36 is connected by a management bus 72 to host complex 30, and is thus able to wake server 26 when instructed to do so by instructions conveyed in management packets over network 32.

Management of the network connection of the BMC 36 to a management network is described, in the document *Network Controller Sideband Interface (NC-SI) Specification*, DSP0222, Ver. 1.1.0 (2015 Sep. 23), which is herein incorporated by reference. Exemplary reasons for transferring packets to the management network include: assigning specific queue-pairs to the management network traffic; associating specific network addresses (MAC, MAC+VLAN, IP, and combinations) for automatic association; associating a specific L2 network protocol to the management network (e.g., Ethernet to the management network and InfiniBand to the data network); associating a specific upper-layer network protocol to the management network (e.g., IPMI going to the management network and other protocols to the data network); and combinations of the above.

Figure 2:
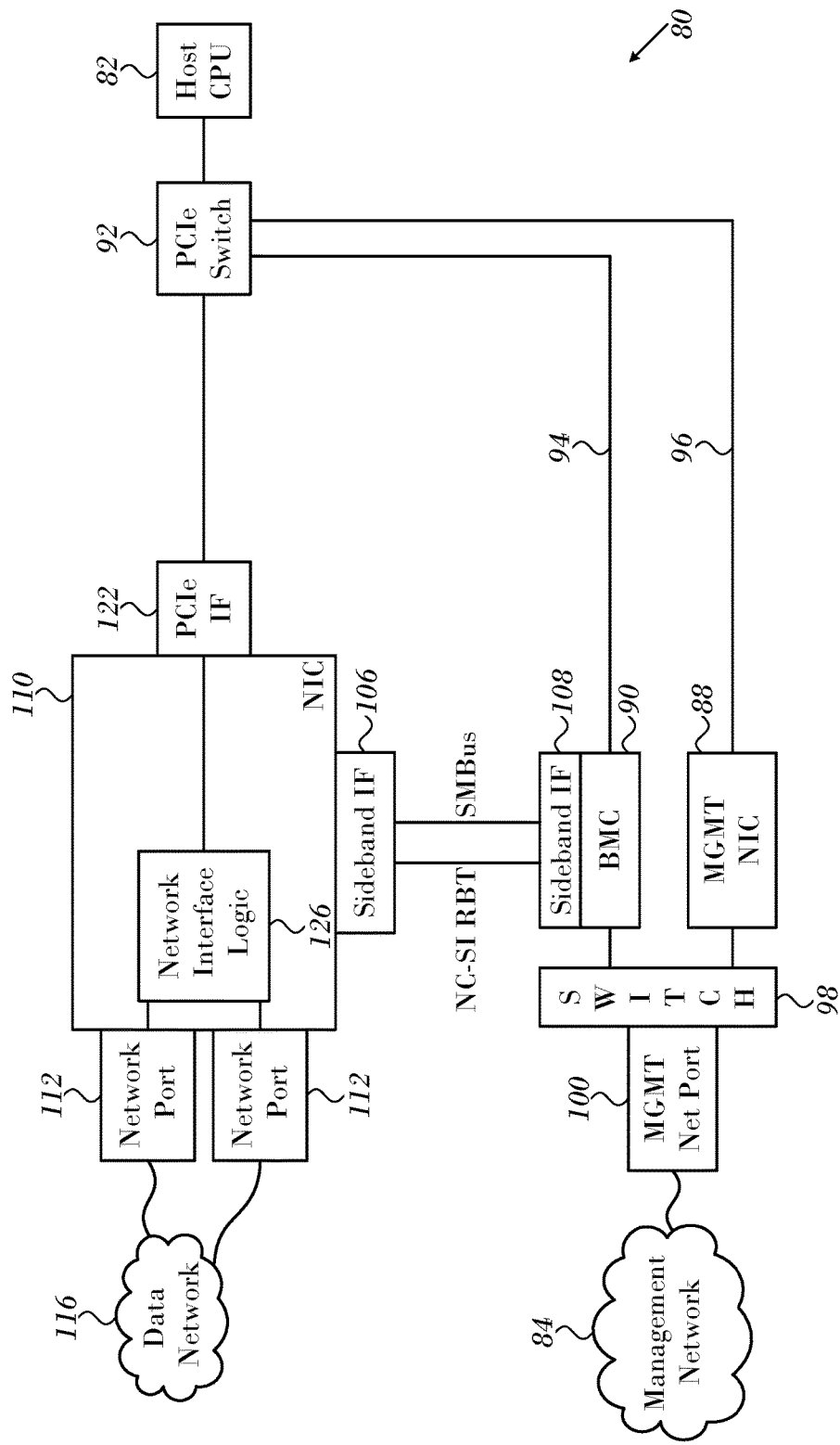
FIG. 2 is a block diagram of a system in which a host CPU is able to interact with a management network in accordance with the prior art.
Figure 3:
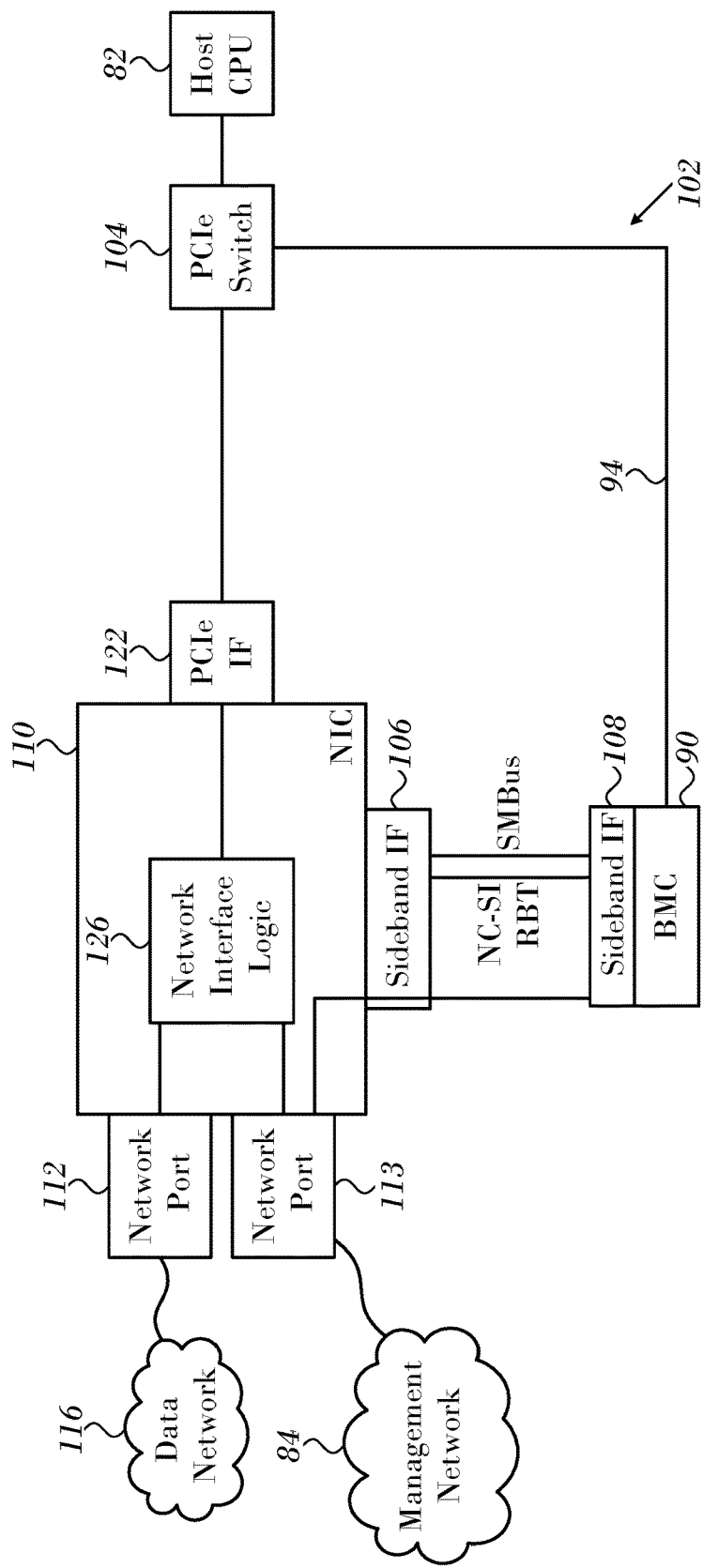
FIG. 3 is a block diagram of a system in which a host CPU is able to interact with a management network using out-of-band management in accordance with the prior art.
Figure 4:
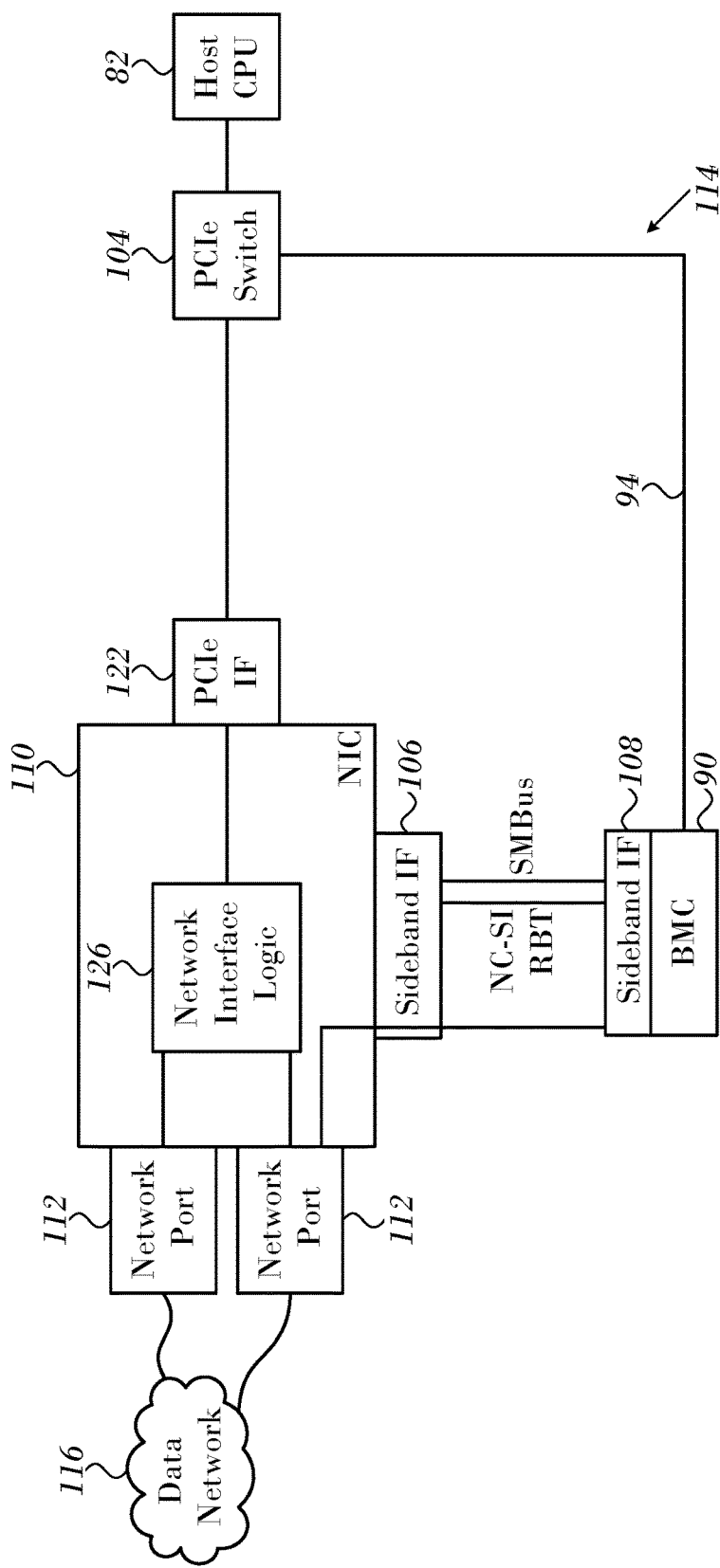
FIG. 4 is a block diagram of a system in which a host CPU is able to interact with a management network using in-band management in accordance with the prior art.

The principles of the invention can be appreciated by comparison to prior efforts in the art to connect the CPU of a host computer management network as shown in FIGS. 2-4. FIG. 2 is a block diagram of a system 80 in which a host CPU 82 is able to interact with a management network 84. A management NIC 88 and BMC 90 connect to PCIe switch 92 by separate buses 94, 96, respectively. A switch 98 connects to the management network 84 via a management port 100 and has connections to the BMC 90 and management NIC 88. Signals and data exchanged with between the host CPU 82 and the management network 84 travel through the PCIe switch 92, bus 96, management NIC 88, switch 98 and management port 100. The system 80 requires components that are not found in legacy systems: the switch 98, management NIC 88, bus 96 and the specially configured PCIe switch 92. Switch 98 is also required in the system 80 to support multiple connections through management port 100.

FIG. 3 is a block diagram of a system 102 that is an example of out-of-band management to provide capabilities similar to the system 80 (FIG. 2). Communication from the host CPU 82 to the management network is mediated through the BMC 90 via bus 94 and PCIe switch 104. The BMC 90 accesses the management network 84 via sideband interfaces 106, 108, NIC 110 and port 113 while other network data is exchanged via port 112. This arrangement allows the host CPU 82 or the BMC 90 to access the management network 84 directly. In the configuration shown in FIG. 2 the BMC 90 uses the sideband interfaces 106, 108 only to control and monitor the NIC 110, for example using methods defined in the above-noted document *Network Controller Sideband Interface (NC-SI) Specification*, DSP0222, Ver. 1.1.0 (2015 Sep. 23). In the configuration shown in FIG. 3 the BMC 90 uses the sideband interfaces 106, 108 to connect to the management network as pass-through traffic mode in addition to the control and monitoring activities of the NIC 110, as defined in the above-noted NC-SI Specification.

FIG. 4 is a block diagram of a system 114 that is an example of in-band management to provide capabilities similar to the system 80 (FIG. 2). The sideband interfaces 106, 108 enable the BMC 90 to connect to data network 116 via the NIC 110 in a pass-through traffic mode as defined in the above-noted NC-SI Specification. The bus 94 connecting the BMC 90 and the PCIe switch 104 is required.

The following embodiments of the present invention allow the host CPU to connect to the management network by using the sideband interface to access the management network through the BMC, thus avoiding the need for an additional port on the NIC. This functionality is in addition to the ability of the BMC to manage the NIC over the same sideband interface. The embodiments have the following advantageous features:

1. The BMC implements a switch layer, which allows incoming traffic from the NIC over the sideband interface to be forwarded to the management network.

2. The NIC implements a data path from the host CPU to the sideband interface.

3. The NIC exposes an additional network device to the operating system of the host CPU that represents the management network connection, allowing the operating system to connect to the management network as if the NIC had an additional network port.

4. The management network can use a different physical protocol than the protocol used by the ports of the NIC that connect to a data network.

Advantages of these embodiments include hardware and cost savings:

1. There is no need for an additional dedicated NIC to connect to the management network.

2. There is no need for an additional PCIe connection to the additional NIC.

3. There is no need for additional physical connections (or addition of networking switch hardware) to connect to the management network.

4. There is no need for an additional switch to connect a dedicated NIC and a BMC to the management network.

First Embodiment

Figure 5:
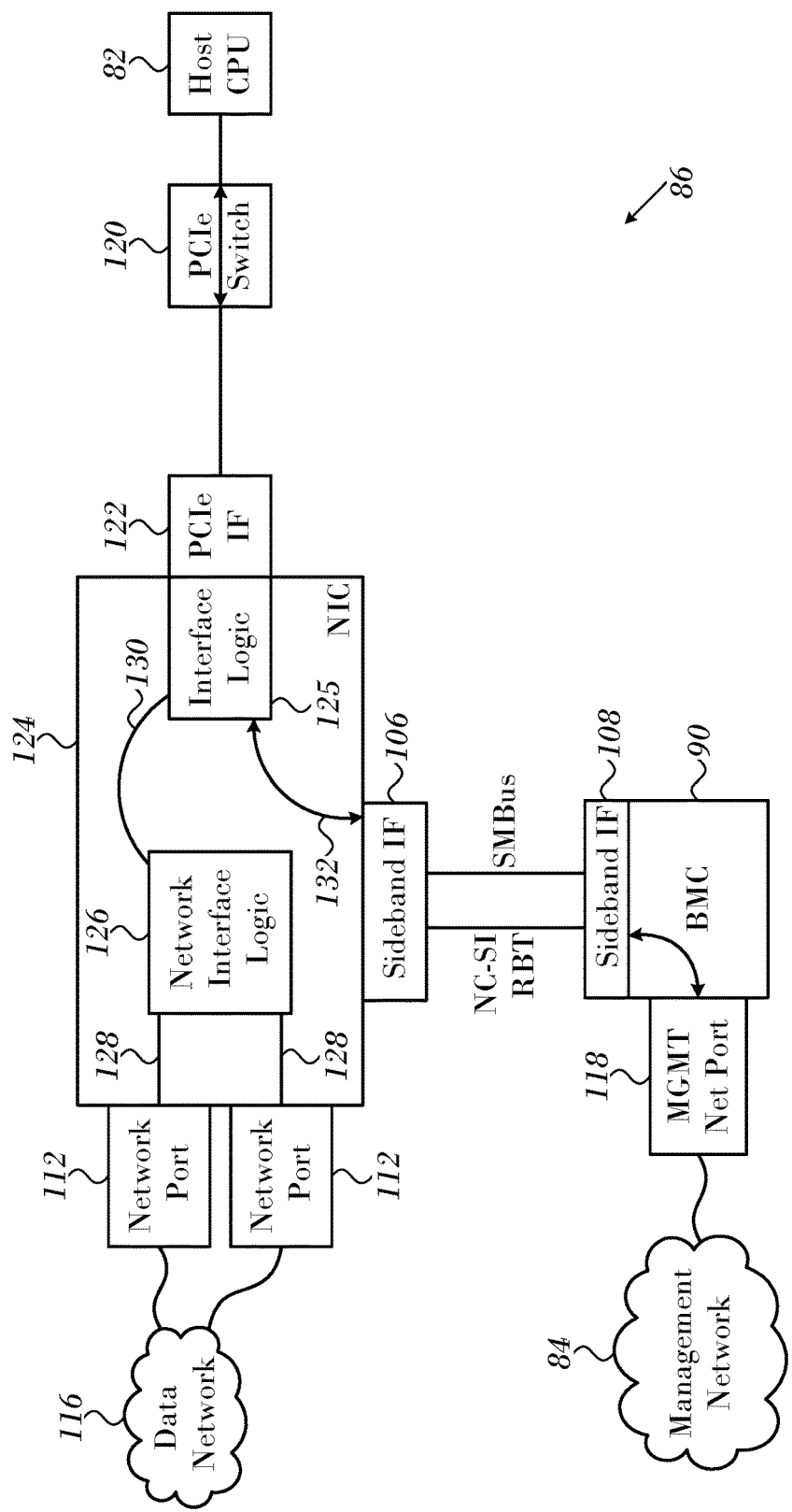
FIG. 5 is a block diagram of a system in which a host CPU is able to interact with a management network in accordance with an embodiment of the invention.

FIG. 5 is a block diagram of the system 86 in which the NIC allows the host CPU 82 to pass traffic through a sideband interface in accordance with an embodiment of the invention. A sideband interface 106 of a modified NIC 124 is connected to a specially configured BMC 90 via interface 108 using conventional transport conventions, e.g., SMBus, NC-SI RBT. The BMC 90 forwards the traffic to the management network 84 via dedicated management network port 118.

Host CPU 82 connects to data network 116 through PCIe switch 120 and a host interface, shown as PCIe interface 122, and NIC 124. PCIe switch 120 is also used to connect to other system components (not shown), e.g., storage disks, graphic engines. PCIe switch 120 may be integrated with the host CPU 82, or be an independent device, or may be one of multiple PCIe switch devices (not shown), where some may be integrated with the host CPU 82. Within NIC 124 network interface logic 126 directs data originating from the host CPU 82 to selected ports 112 via paths 128 and thence to the data network 116. A path 130 connects the network interface logic 126 with the PCIe interface 122.

An additional path 132 is implemented through the NIC 124, connecting PCIe interface 122 and sideband interface 106. Interface logic 125, which may be implemented in hardware, software, or combinations thereof, is linked to the PCIe interface 122. The interface logic 125 selects path 130 for network traffic and path 132 for management network traffic. Traffic following path 132 continues into the BMC 90 through interface 108, and reaches the management network 84 through management network port 118. In this embodiment the path 132 may be realized by addition of dedicated hardware, software, or combination thereof that connects to the sideband interface 106.

In this configuration the host CPU 82 can access the management network 84 through the BMC 90. The BMC 90 acts as a networking switch between the management network 84 and the sideband interface 106 of the NIC 124. The BMC 90 is provided with switch logic that can route traffic arriving from the management network 84 that is destined for the NIC 124 or the host CPU 82 as the case may be.

Second Embodiment

Figure 6:
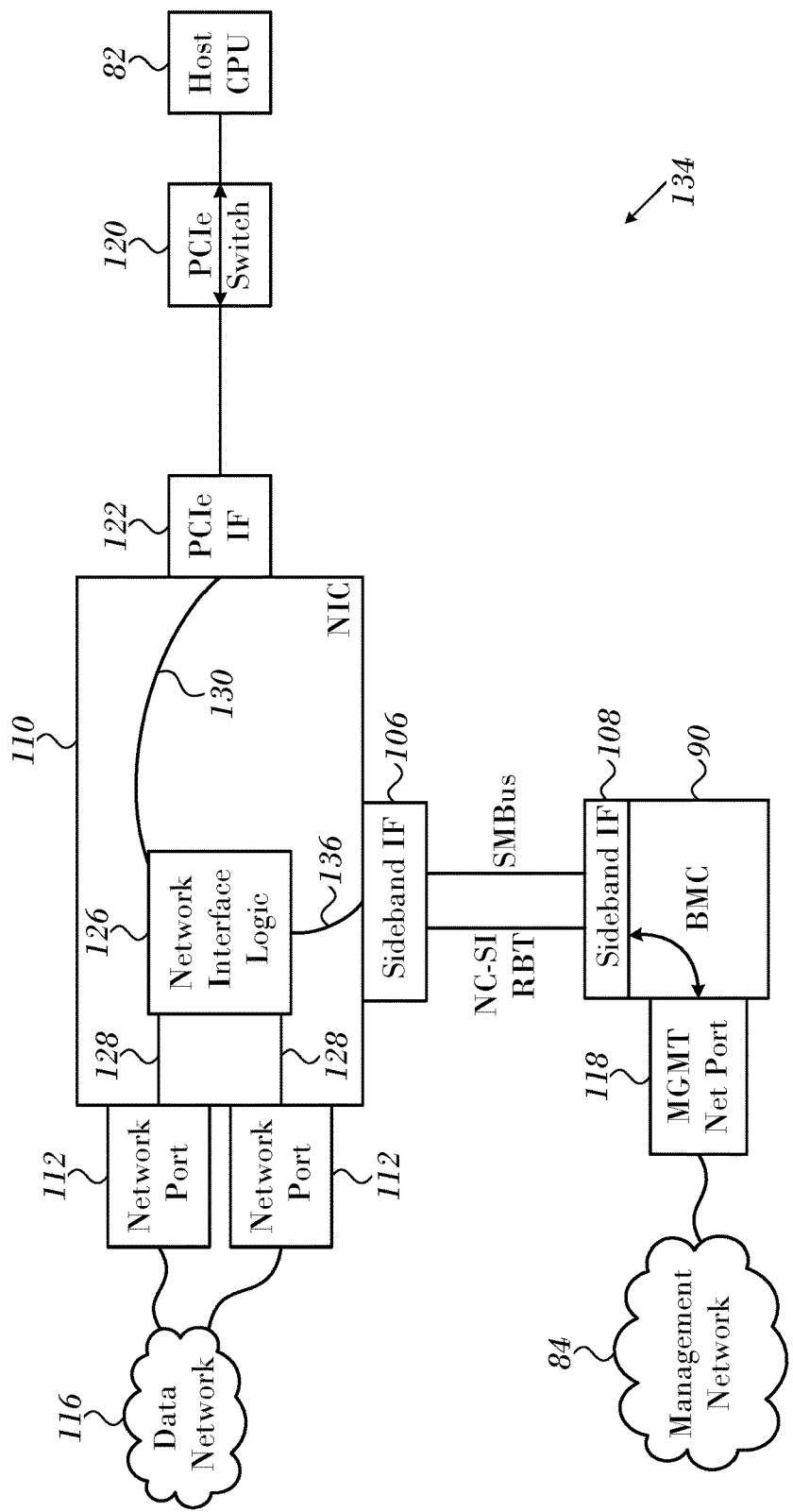
FIG. 6 is a block diagram of a system in which a host CPU is able to interact with a management network in accordance with an alternate embodiment of the invention.

FIG. 6 is a block diagram of a system 134 in which the NIC allows the host CPU 82 to pass traffic through a sideband interface. In this embodiment the sideband interface 106 is connected to the network interface logic 126 by a path 136. The network interface logic 126 determines that received data via the path 136 is destined for the host CPU 82, and routes the data to the PCIe interface 122 via the path 130. This embodiment can be implemented in the NIC 110 without hardware changes.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. Apparatus for communication, comprising:
a host computer having a host central processing unit;
a network interface controller having a plurality of network ports connectable to a data network;
a host interface in the network interface controller linked to the host central processing unit;
a sideband interface in the network interface controller;
a baseboard management controller linked to the network interface controller via the sideband interface, the baseboard management controller having a management network port and being connectable to a management network via the management network port; and
a link in the network interface controller between the host interface and the sideband interface of the network interface controller for transmission of data between the host central processing unit and the management network via the baseboard management controller.

2. The apparatus according to claim 1, further comprising interface logic circuitry in the network interface controller, adapted to select one of a management data path to conduct management traffic between the host interface and the sideband interface and a network data path to conduct network traffic between the host interface and the network ports.

3. The apparatus according to claim 2, wherein the interface logic circuitry further comprises network interface logic in the network data path for selecting the network ports for transmission of the network traffic therethrough.

4. The apparatus according to claim 1, further comprising switch logic circuitry in the baseboard management controller configured to selectively route traffic arriving from the management network to one of a termination in the network interface controller and the host central processing unit through the link in the network interface controller.

5. The apparatus according to claim 1, further comprising interface logic circuitry in the network interface controller that is linked to the host interface, the network ports and the sideband interface, wherein the interface logic circuitry is configured to select one of a management data path to conduct management traffic between the baseboard management controller and the host central processing unit and a network data path to conduct network traffic between the host central processing unit and the network ports.

6. The apparatus according to claim 1, further comprising a Peripheral Component Interconnect Express (PCIe) switch linked to the host interface and the host central processing unit.

7. The apparatus according to claim 1, wherein communication between the network interface controller and the data network is carried out using a first communications protocol and communication between the baseboard management controller and the management network is carried out using a second communications protocol.

8. A method of communication, comprising the steps of:
in a system comprising a host computer having a host central processing unit, a network interface controller having a plurality of network ports, a host interface in the network interface controller linked to the host central processing unit, a sideband interface in the network interface controller:
linking a baseboard management controller having a management network port to the network interface controller via the sideband interface;
connecting the baseboard management controller to a management network via the management network port;
connecting the network interface controller to a data network through the network ports;
establishing a management data path in the network interface controller between the host interface and the sideband interface of the network interface controller; and
transmitting data between the host central processing unit and the management network via the baseboard management controller and via the management data path.

9. The method according to claim 8, further comprising the steps of:
selecting in the network interface controller one of the management data path and a network data path;
when the management data path is selected conducting management traffic between the host interface and the sideband interface; and when the network data path is selected conducting network traffic between the host interface and the network ports.

10. The method according to claim 9, further comprising:
when the network data path is selected in the network interface controller directing the network traffic through selected network ports to the data network.

11. The method according to claim 8, further comprising:
in the baseboard management controller selectively routing traffic arriving from the management network to one of a destination in the network interface controller and the host central processing unit.

12. The method according to claim 8, further comprising:
in the network interface controller selecting one of the management data path to conduct management traffic between the baseboard management controller and the host central processing unit and a network data path to conduct network traffic between the host central processing unit and the network ports.

13. The method according to claim 8, wherein the management data path extends through the host interface and a Peripheral Component Interconnect Express (PCIe) switch to the host central processing unit.

14. The method according to claim 8, further comprising the steps of:
communicating between the network interface controller and the data network using a first communications protocol; and
communicating between the baseboard management controller and the management network is using a second communications protocol.

* * * * *